United States Patent
Sasaki et al.

(10) Patent No.: US 8,477,577 B2
(45) Date of Patent: Jul. 2, 2013

(54) METHOD FOR RECORDING ON AND READING OUT FROM OPTICAL INFORMATION RECORDING MEDIUM

(71) Applicant: Fujifilm Corporation, Tokyo (JP)

(72) Inventors: Toshio Sasaki, Odawara (JP); Hidehiro Mochizuki, Odawara (JP); Toshiyuki Kitahara, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/713,888

(22) Filed: Dec. 13, 2012

(65) Prior Publication Data

US 2013/0121123 A1    May 16, 2013

Related U.S. Application Data

(63) Continuation of application No. PCT/JP2011/064674, filed on Jun. 27, 2011.

(30) Foreign Application Priority Data

Jul. 13, 2010  (JP) ................................ 2010-158582

(51) Int. Cl.
*G11B 7/00*  (2006.01)
(52) U.S. Cl.
USPC ................ 369/47.15; 369/112.01; 369/44.37; 369/53.23; 369/275.1
(58) Field of Classification Search
None
See application file for complete search history.

(56) References Cited

U.S. PATENT DOCUMENTS

| 6,515,956 | B2 | 2/2003 | Tamada |
| 7,006,425 | B1 | 2/2006 | Hirao et al. |
| 7,282,684 | B2 * | 10/2007 | Ogiwara .................. 369/112.01 |
| 7,948,853 | B2 * | 5/2011 | Fujita ............................ 369/103 |

(Continued)

FOREIGN PATENT DOCUMENTS

| JP | 2000-228014 A | 8/2000 |
| JP | 2001-325745 A | 11/2001 |

(Continued)

OTHER PUBLICATIONS

Teruhiro Shiono, et al., "Two-Photon Absorption Recording in Photochromic Diarylethenes Using Laser Diode for Three-Dimensional Optical Memory", Japanese Journal of Applied Physics, May 24, 2005, pp. 3559-3563, vol. 44, No. 5B.

(Continued)

*Primary Examiner* — Muhammad N Edun
(74) *Attorney, Agent, or Firm* — Sughrue Mion, PLLC

(57) ABSTRACT

Recording and reading method for optical information recording medium comprising: recording layer having thickness not less than $2\lambda/n$, where $\lambda$ is wavelength of recording beam and n is refractive index of the recording layer, and configured to undergo a change in the refractive index by irradiation with the recording beam; and adjacent layer adjacent to the recording layer at a side opposite to an incident side, comprises the steps of: recording a recording spot by irradiating with the recording beam, while shifting focal position by offset amount d, which satisfies $\omega_0 < d < 3\omega_0$, where $\omega_0$ is radius of the recording spot, from interface between recording layer and adjacent layer toward the incident side at a time of recording, whereby the refractive index of recording layer changes at a recording position to record recording spot; and reading out the information by irradiating with reading beam, while bringing it into focus on the interface.

4 Claims, 11 Drawing Sheets

U.S. PATENT DOCUMENTS

| | | |
|---|---|---|
| 2002/0009037 A1 | 1/2002 | Tamada |
| 2006/0002250 A1 | 1/2006 | Shirota et al. |
| 2006/0072437 A1 | 4/2006 | Shiono et al. |
| 2010/0074077 A1* | 3/2010 | Katayama .................. 369/53.12 |

FOREIGN PATENT DOCUMENTS

| | | |
|---|---|---|
| JP | 2004-220702 A | 8/2004 |
| JP | 2006-018974 A | 1/2006 |
| JP | 4290650 B2 | 7/2009 |
| JP | 2009-277271 A | 11/2009 |

OTHER PUBLICATIONS

T. Shiono, "Two-Photon Absorption Recording in Photochromic Materials Using Laser Diode," Optronics, 2005, pp. 173-178, No. 7.
International Search Report, PCT/JP2011/064674, Sep. 20, 2011.

* cited by examiner

DURING RECORDING

DURING READING

DURING READING

DURING READING

METHOD FOR RECORDING ON AND READING OUT FROM OPTICAL INFORMATION RECORDING MEDIUM

CROSS-REFERENCE TO RELATED APPLICATION(S)

This application is a continuation application of International Application No. PCT/JP2011/064674 filed on Jun. 27, 2011, which claims priority to Japanese Patent Application No. 2010-158582 filed on Jul. 13, 2010, the disclosures of which are incorporated herein by reference in their entity.

TECHNICAL FIELD

The present invention relates to a method for recording on and reading out from an optical information recording medium.

BACKGROUND ART

To record information in multiple layers of an optical information recording medium, in recent years, research has been made on a method for causing a recording material contained in the optical information recording medium to produce an optical change using a multi-photon absorption reaction such as two-photon absorption (see, for example, Patent Literature 1). Similar to a widely-used conventional optical information recording medium with a single recording layer, according to an optical information recording medium utilizing a multi-photon absorption reaction, a change in the refractive index of a recording material at a recording region and the thickness of the recording layer are determined, in consideration of the fact that reflected lights reflected at both upper and lower interfaces of the recording layer interfere with each other upon reading out the information (this is called interference effect), such that the difference between the reflectivity at a recorded portion and the reflectivity at a non-recorded portion (i.e., difference in the ratio of light beams which are reflected at the upper and lower interfaces of the recording layer and interfere with each other, and thereafter return to an optical pickup) is large. In an information recording medium disclosed in Patent Literature 1, consideration is made on the relationship between the film thickness and the reflectivity as shown in FIG. 2 of this literature, and the paragraph [0062] suggests that the thickness of the recording layer is preferably around $\lambda/4n$, where $\lambda$ is the wavelength of the readout beam, and n is the refractive index of the recording layer, or even thinner to have a thickness of around 5-50 nm.

Another optical information recording medium which does not utilize interference effect as utilized in above literature is disclosed in Patent Literature 2. According to this known optical information recording medium, a fluorescent-light emission layer is provided under the recording layer, and the light emitted by the fluorescent-light emission layer is detected through the recording layer to read out the information.

CITATION LIST

Patent Literature

Patent Literature 1: Japanese Patent No. 4290650
Patent Literature 2: Japanese laid-open patent application publication No. 2001-325745

SUMMARY OF THE INVENTION

Technical Problem

However, if the interference effect of the reflected lights reflected at both interfaces of the recording layer is utilized upon reading out the information as with Patent Literature 1, the recording layer must be produced to have so exact film thickness as designed to obtain an excellent degree of modulation. This requires the accuracy of the film thickness and thus leads to increased manufacturing cost of the optical information recording medium.

Further, if, as with Patent Literature 2, a fluorescent light emitted is regarded as a base light and the modulation is obtained from the variations of the light received by a light detector for detecting how much of the base light returns, it is difficult to obtain an acceptable reproduction output because the emitted fluorescent light is very weak.

In view of the above, the present invention seeks to provide a method for recording on and reading out from an optical information recording medium, which provides an excellent reproduction output without requiring highly-accurate film thickness of the recording layer.

Solution to Problem

In order to solve the aforementioned problems, the present invention provides a method for recording information in an optical information recording medium and thereafter reading out the information from the optical information recording medium. The optical information recording medium comprises: a recording layer having a thickness equal to or is greater than $2\lambda/n$, where $\lambda$ is a wavelength of a recording beam and n is a refractive index of the recording layer, and configured to undergo a change in the refractive index by irradiation with the recording beam; and an adjacent layer disposed adjacent to the recording layer at a side opposite to an incident side from which the recording beam enters the recording layer. The method comprises the steps of: recording a recording spot by irradiating the optical information recording medium with the recording beam, while shifting a focal position by an offset amount d, which satisfies $\omega_0 < d < 3\omega_0$, where $\omega_0$ is a radius of the recording spot to be recorded in the recording layer, from an interface between the recording layer and the adjacent layer toward the incident side at a time of recording the information, whereby the refractive index of the recording layer changes at a recording position to record the recording spot; and reading out the information by irradiating the optical information recording medium with a reading beam, while bringing the reading beam into focus on the interface.

According to this recording and reading method for an optical information recording medium, the recording layer, which is thicker than that of the conventional optical information recording medium utilizing interference effect, undergoes a change in the refractive index within a wide region thereof in a traveling direction of the recording beam (hereinafter simply referred to as a "depth direction") to thereby record a recording spot. Since a change in the refractive index occurs during recording in accordance with the intensity distribution of the recording beam, if the recording spot is irradiated with the reading beam upon reading out the information, the recording spot acts as a lens and this lens effect causes the reading beam to diverge away from the recording spot or to converge in the recording spot. Accordingly, if the recording layer is irradiated with the reading beam for reading out the information while bringing the reading beam into focus on the interface, the intensity of the light returned from the recording spot becomes weaker (as the refractive index becomes smaller) or stronger (as the refractive index becomes larger). This creates a difference in the intensity of light from the light returned from the interface of a non-recorded portion, whereby the information is regenerated based on the modulation by the difference of intensities. According to the conventional method for recording on and reading from an optical information recording medium utilizing interference effect, a recording spot does not act as a lens because the thickness of the recording layer is thin. In contrast, according to the present invention, a thick recording layer is used, and in order to sufficiently exert the lens effect in this thick recording layer, the focal position of the recording beam is shifted by the offset amount d from the interface between the recording layer and the adjacent layer, so that recording and reading of the information is performed with the modulation as described above.

Since this recording and reading method does not utilize the interference effect, it is possible to readily manufacture optical information recording media without requiring the accuracy of the film thickness for the recording layer. Further, since the source for generating a readout beam (in this specification, the readout beam refers to a modulated beam that is radiated as a reading beam and returned from the recording layer) does not utilize fluorescence but instead utilizes a reading beam reflected from the interface, the intensity of the readout beam increases and an excellent reproduction output is obtained.

A recording material contained in the recording layer may be a multi-photon absorption compound. In this instance, since the refractive index of the recording material may be selectively changed in the depth direction within a limited range, it is possible to readily produce multi-layered recording layers to increase the capacity of the recording medium.

In the aforementioned recording and reading method, the full width at half maximum of spectrum of the reading beam is preferably equal to or greater than 8 nm.

The conventional recording and reading method utilizes the interference effect. For is this reason, in general, the reading beam has a small full width at half maximum and the coherence length thereof is long. However, the recording and reading method according to the present invention does not utilize the interference effect, so that the coherence length of the reading beam can be reduced in contrast to the reading beam used in the conventional method. As a result, interference between the readout beam and a plurality of reflected lights from interfaces other than that of the recording layer used for reading out the information (i.e., multiple interference effect) is suppressed to obtain a high signal-to-noise ratio.

In the aforementioned recording and reading method for an optical information recording medium, it is preferable that a confocal optical system is used for reading out the information.

With the use of the confocal optical system while reading out the information, the reflected light from the interface between the recording layer and the adjacent layer is allowed to pass through and other lights are blocked to reduce noise. As a result, the information is read out with an excellent signal-to-noise ratio.

Other aspects and advantages of the present invention will become apparent from the following detailed description taken in conjunction with the accompanying drawings.

DESCRIPTION OF EMBODIMENTS

One exemplified embodiment of the present invention will be described below with reference to the drawings.

Figure 1:
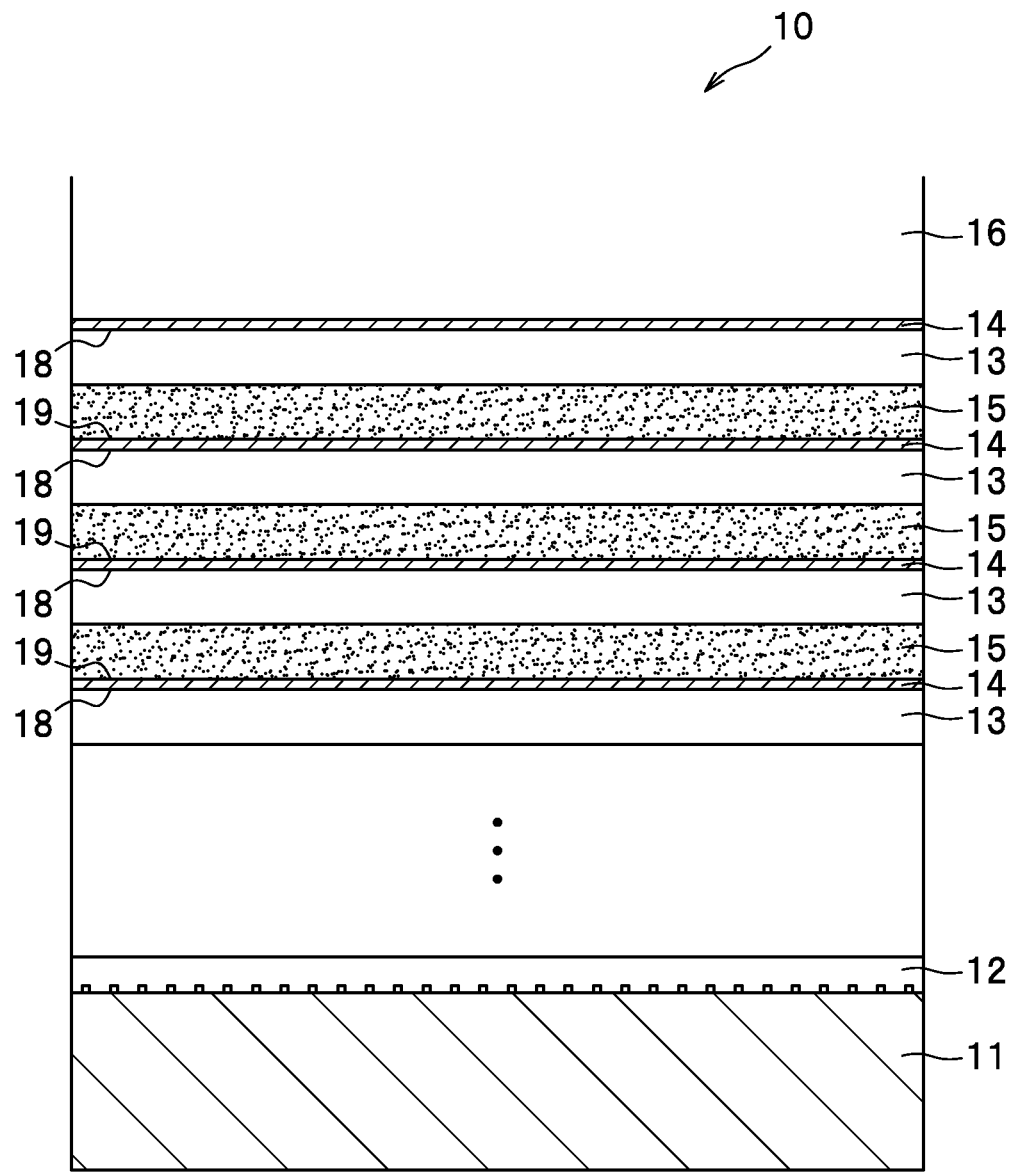
FIG. 1 is a sectional view of a multi-layered optical information recording medium.

A recording and reading method for an optical information recording medium according to the present invention uses, as an example, a multi-layered optical information recording medium 10 as shown in FIG. 1.

The optical information recording medium 10 comprises a substrate 11, a servo signal layer 12, a plurality of intermediate layers 13, a plurality of recording layers 14, a plurality of adhesive layers 15, and a cover layer 16.

The substrate 11 is a support member for supporting the recording layers 14 and other layers. As an example, the substrate 11 is a circular plate made of polycarbonate. The material and the thickness of the substrate 11 are not specifically limited.

The servo signal layer 12 is made of a tacky or adhesive resinous material and configured to retain the intermediate layers 13, the recording layers 14 and the adhesive layers 15 on the substrate 11. A servo signal is previously recorded in the servo signal layer 12 at a surface close to the substrate 11; the servo signal is recorded as an irregular pattern or by utilizing the change in the refractive index. Herein, the servo signal is a previously set signal for assisting a recording and reading apparatus 1 to recognize the servo signal layer 12 as a focus reference surface during recording and reading out the information. To bring the focus on a predetermined recording layer 14, focus control is performed taking into account the distance from the reference surface and the number of interfaces. Further, to accurately irradiate the track of the circumferentially arranged recording spots with a laser beam at the time of recording and reading out the information, it is preferable that a tracking servo signal or a groove for tracking is previously provided.

The recording layer 14 is made of a photosensitive material on which information is optically recordable. Irradiating the recording layer 14 with the recording beam (irradiated light for recording) causes the recording layer 14 to undergo a change in the refractive index. Change in the refractive index caused by irradiation of the recording beam may be an increase from a lower state to a higher state or alternatively a decrease from a higher state to a lower state. As an example in this embodiment, a recording material which undergoes a change in the refractive index from a higher state to a lower state is used in the recording layer 14. The recording material used for the recording layer 14 may be prepared, for example, by dispersing a recording beam-absorbing dye in a polymer binder. Specific examples of the polymer binder may include polyvinyl acetate (PVAc), polymethylmethacrylate (PMMA), polycarbonate (PC), polystyrene (PS), and polyvinyl alcohol (PVA).

Examples of the recording beam-absorbing dye may include dyes which have been conventionally used as a thermally deformable heat mode type recording material. For example, a phthalocyanine-based compound, an azo compound, an azo metal complex compound, and methine dyes (e.g., a cyanine-based compound, an oxonol-based compound, a styryl dye, and a merocyanine dye) may be used as the recording beam-absorbing dye. Further, to minimize adverse effects on adjacent recording layers during recording on and reading from the recording medium having a multi-layered recording layers, it is preferable that a multi-photon absorption dye is used as the recording beam-absorbing dye. As an example of the multi-photon-absorption recording material, a two-photon absorption compound without having a linear absorption band at the wavelength of the reading beam is preferable.

As long as the two-photon absorption compound does not have a linear absorption band at the wavelength of the reading beam, any known two-photon absorption compound may be used; for example, compounds having a structure represented by the following formula (1) may be used.
[Chem. 1]

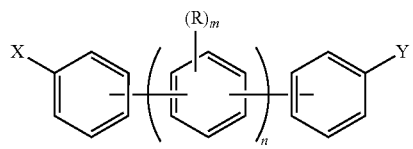

Formula (1)

In Formula (1), each of X and Y may represent a substituent having a Hammett's sigma para-value (σp value) of 0 or more, which may be the same with or different from each other; n represents an integer of 1 to 4; R represents a substituent, and a plurality of Rs may be the same with or different from each other; and m represents an integer of 0 to 4.

In Formula (1), each of X and Y represents a group having a σp value taking a positive value in Hammett equation, i.e., what is called an electron-withdrawing group, preferably, e.g., a trifluoromethyl group, a heterocyclic group, a halogen atom, a cyano group, a nitro group, an alkylsulfonyl group, an arylsulfonyl group, a sulfamoyl group, a carbamoyl group, an acyl group, an acyloxy group, an alkoxycarbonyl group and the like, more preferably a trifluoromethyl group, a cyano group, an acyl group, an acyloxy group, and an alkoxycarbonyl group, and most preferably a cyano group and a benzoyl group. Of these substituents, an alkylsulfonyl group, an arylsulfonyl group, a sulfamoyl group, a carbamoyl group, an acyl group, an acyloxy group and an alkoxycarbonyl group may further have a substituent for various purposes including giving solubility in a solvent. The examples of the substituents include an alkyl group, an alkoxy group, an alkoxyalkyl group, an aryloxy group, etc.

n represents an integer of 1 or more and 4 or less, preferably 2 or 3, and most preferably 2. If n is 5 or more, it is said that the greater n becomes, the more the linear absorption appears at the longer wavelength side, so that non-resonant two-photon absorption recording is not done with a recording beam at a wavelength band shorter than 700 nm.

R represents a substituent. The substituent is not specifically limited, and an alkyl group, an alkoxy group, an alkoxyalkyl group, and an aryloxy group are exemplified as specific examples. m represents an integer of 0 or more and 4 or less.

The compound having the structure represented by Formula (1) is not specifically limited; for example, compounds represented by the following chemical structural formulae D-1 to D-21 may be used.

[Chem. 2]

D-1

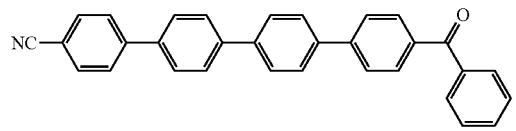

D-2

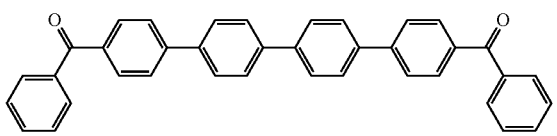

D-3

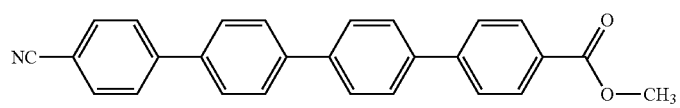

D-4

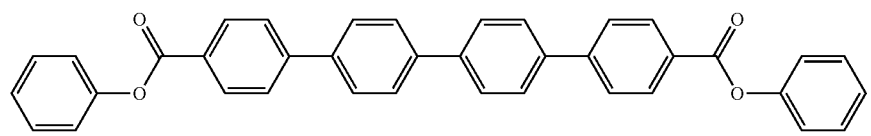

D-5

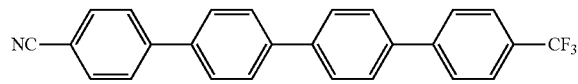

D-6

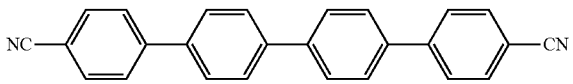

-continued
D-7
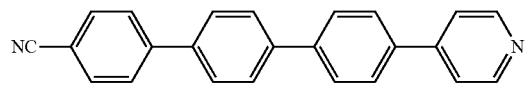
D-8
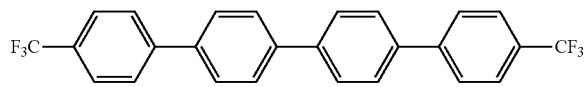
D-9
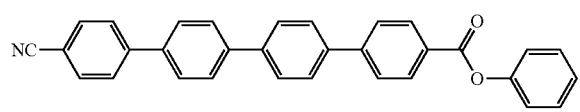
D-10
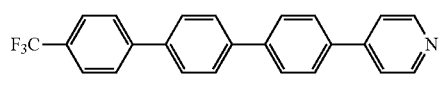
D-11
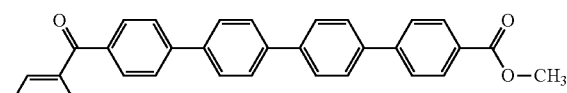
D-12
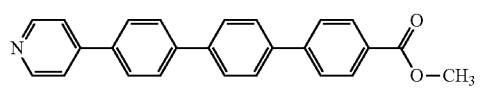
D-13
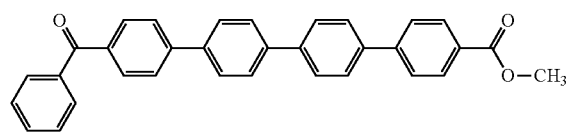
D-14
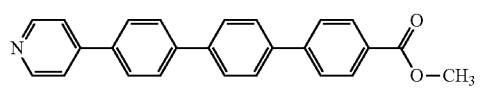
D-15
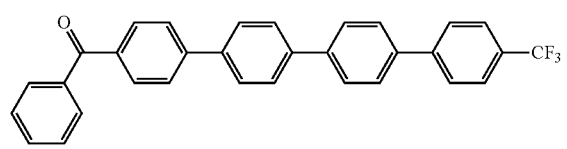
D-16
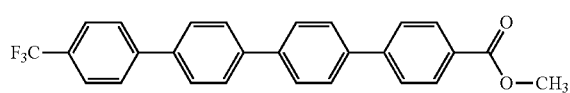
D-17
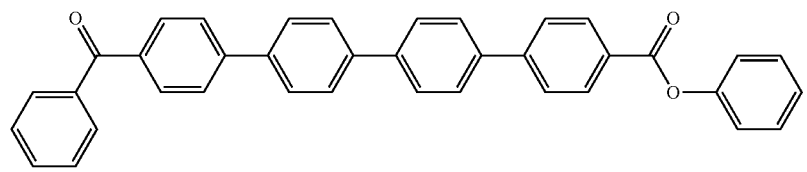
D-18
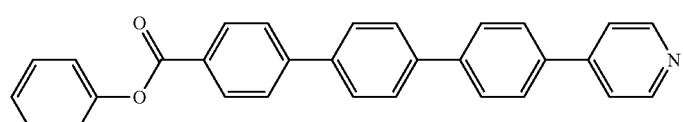
D-19
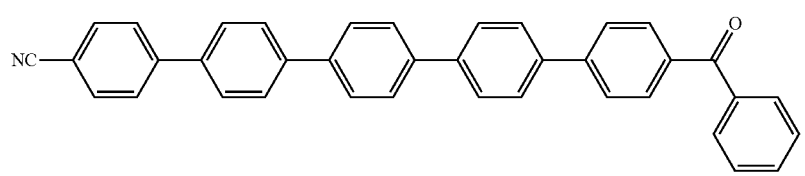
D-20
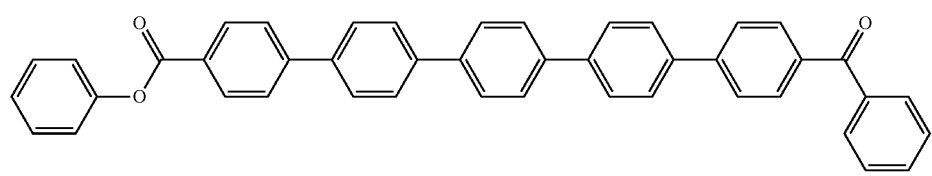
D-21
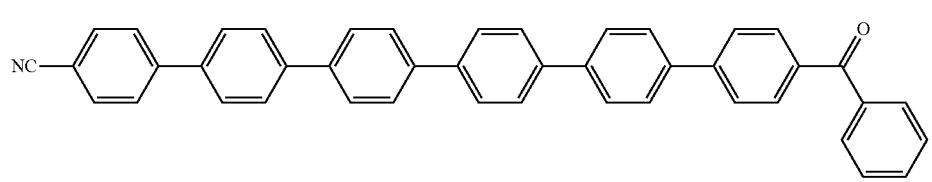

Figure 2:
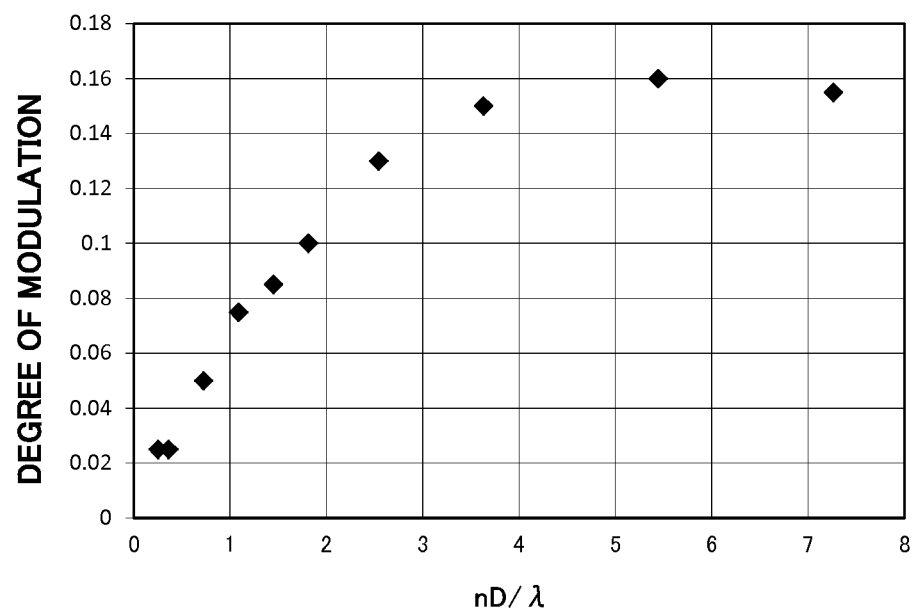
FIG. 2 is a graph showing the relationship between thickness of the recording layer and degree of modulation.

The recording layer 14 has a thickness equal to or greater than $2\lambda/n$, where $\lambda$ is the wavelength of the recording beam and n is the refractive index of the recording layer 14. As seen in FIG. 2, when calculating the relationship between $nD/\lambda$ (where D is the thickness of the recording layer) and degree of modulation (i.e., value obtained from the intensity of the detected light by (Maximum value−Minimum value)/Maximum value), if $nD/\lambda$ is equal to or greater than 2, the degree of modulation is 0.1 or more, and it is thus shown that an excellent degree of modulation is achieved. This reveals that the thickness D is preferably equal to or greater than $2\lambda/n$.

As an example, if the wavelength of the recording beam is 522 nm and the refractive index of the recording layer 14 is 1.47, the thickness of the recording layer 14 should be 710 nm or more. This thickness is several-fold thicker than that of the conventional optical information recording medium utilizing interference effect. Accordingly, when a recording spot is formed in the recording layer 14, the recording spot has a lens effect.

Although the thickness of the recording layer 14 does not have an upper limit, it is preferable that the thickness thereof is equal to or smaller than 5 μm in order to increase the number of recording layers 14 to as many as possible. In this embodiment, as an example, the thickness of the recording layer 14 is 1 μm. The number of recording layers 14 provided is, for example, approximately from 1-10 layers. To increase the storage capacity of the optical information recording medium 10, a large number of recording layers 14, for example, 10 or more recording layers 14 are preferable.

The intermediate layer 13 is an example of an adjacent layer. As seen in FIG. 1, each intermediate layer 13 is disposed adjacent to one side of each recording layer 14, which is positioned closer to the substrate 11. In other words, the intermediate layer 13 is adjacent to the recording layer 14 at a side opposite to that from which the recording beam enters the recording layer 14. The intermediate layer 13 is made of a material which is unreactive to irradiation of the laser beam at the time of recording and reading out the information. As an example, the intermediate layer 13 may be made of polyethylene terephthalate. In order to prevent crosstalk across a plurality of recording layers 14 (i.e., phenomenon by which a signal from one recording layer 14 is mixed with another signal from an adjacent recording layer 14), the intermediate layer 13 is provided to form a predetermined amount of space between the adjacent recording layers 14. For this purpose, the thickness of the intermediate layer 13 is equal to or more than 3 μm. As an example, the intermediate layer 13 is 5 μm thick in this embodiment.

To enable reflection of the reading beam at the interface 18 between the intermediate layer 13 and the recording layer 14, it is preferable that the refractive index of the intermediate layer 13 is set to be different to some appropriate degree from that of the recording layer 14. Meanwhile, it is not preferable that the interface 18 between the recording layer 14 and the intermediate layer 13 reflects too much light and provides extremely high reflectivity. This is because a record/readout beam (i.e., beam including a is recording beam, a reading beam, and a readout beam in this specification) is prevented from reaching deeper layers at the time of recording and reading out the information, with the result that it is difficult to record and read out the information at deeper recording layers 14. In view of this, the reflectivity of the interface 18 between the intermediate layer 13 and the recording layer 14 to the record/readout beam is preferably around 0.2-2%.

The adhesive layer 15 is provided to intimately connect a recording layer 14 and an intermediate layer 13 which is located above the recording layer 14 (at a side closer to the cover layer 16). In this embodiment, the recording layer 14 is 1 μm thick. In order to prevent a possible adverse effect that the reading beam reflected at the interface 19 between the adhesive layer 15 and the recording layer 14 interferes with the reading beam reflected at the interface 18 between the recording layer 14 and the intermediate layer 13 and this adversely affects the quality of the readout beam, it is preferable that the difference in the reflectivity is as small as possible between the adhesive layer 15 and at the recording layer 14 and further that the refractive index of the adhesive layer 15 is adjusted to satisfy R2>R1, where R1 is the refractive index of the interface 19 and R2 is the refractive index of the interface 18. Further, it is more preferable that the refractive index of the adhesive layer 15 and the refractive index of the recording layer 14 are substantially equalized so that the reflectivity of the interface 19 is substantially zero. The adhesive layer 15 is made, without limitation, of a material which sufficiently transmits the record/readout beam. Specific examples of this material may include: adhesives prepared by dissolving in a solvent an acrylic compound, a methacryl compound, a polyvinyl chloride compound, a polyvinyl alcohol compound, a polyvinyl acetate compound, a polystyrene compound or a polymer compound such as cellulose; light curing adhesives mainly containing an acrylate compound, an epoxy compound or an oxetane compound; hot-melt adhesives mainly containing an ethylene-vinyl acetate compound, an olefin compound or an urethane compound; and is tackiness agents consisting of an acrylic compound, an urethane compound or a silicone compound. Further, the thickness of the adhesive layer 15 is not limited; as an example in this embodiment, the adhesive layer 15 is 5 μm thick.

The cover layer 16 is provided to protect the intermediate layers 13, the recording layers 14, and the adhesive layers 15. The cover layer 16 is made of a material which allows a laser beam to pass therethrough at the time of recording and reading out information. The cover layer 16 has an appropriate thickness in the range from several tens micro meters to several millimeters.

Figure 3:
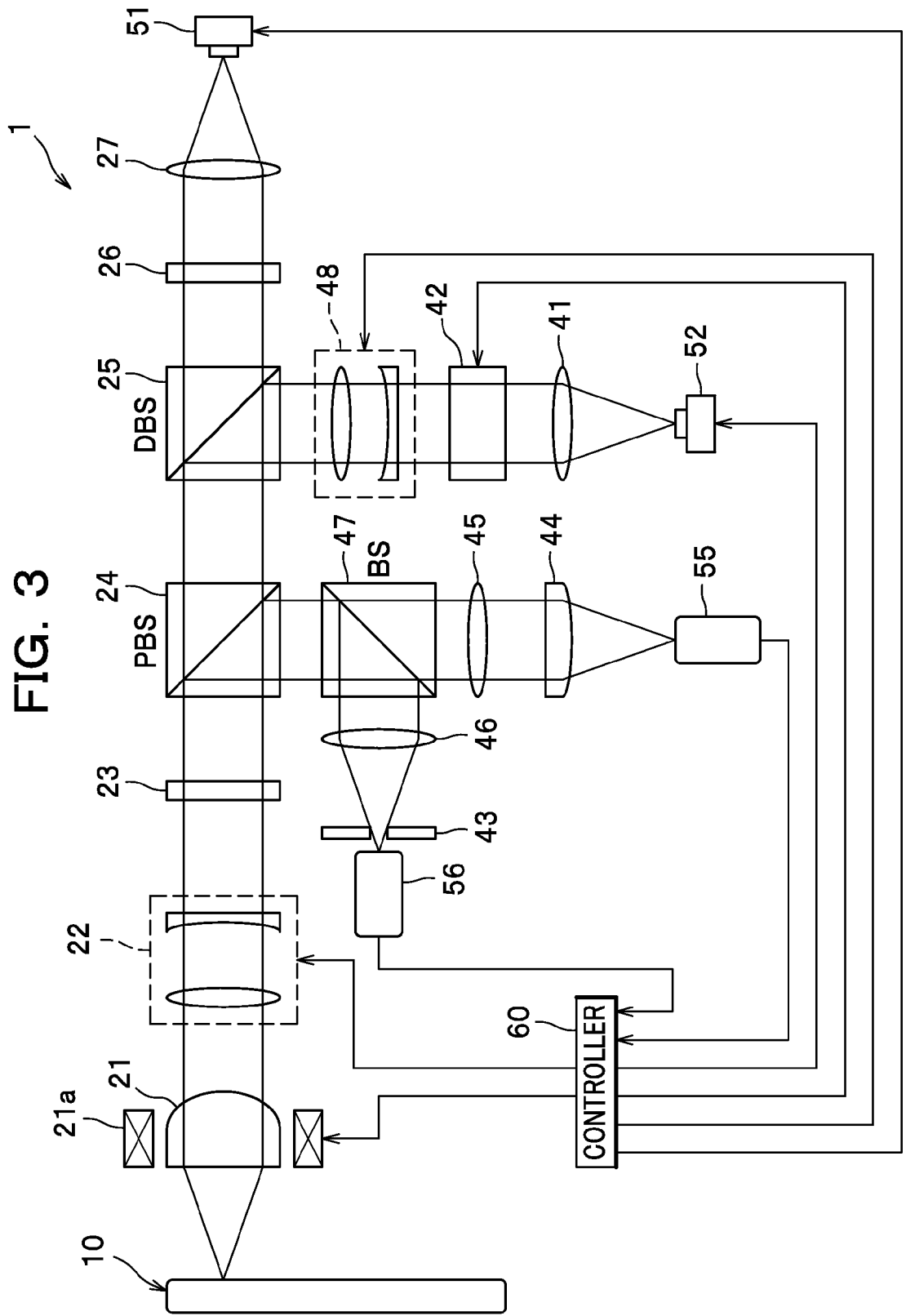
FIG. 3 is a diagram showing the structure for a recording and reading apparatus according to a first embodiment.

Next, description will be given of the structure of a recording and reading apparatus. As seen in FIG. 3, the recording and reading apparatus 1 is configured to perform recording and reading of information in the optical information recording medium 10.

The recording and reading apparatus 1 includes an objective lens 21 facing the optical information recording medium 10. In the recording and reading apparatus 1, a beam expander 22 for correcting aberration, a quarter-wave plate 23, a PBS (polarizing beam splitter) 24, a DBS (dichroic beam splitter) 25, a half-wave plate 26, a collimating lens 27, and a reading laser 51 are arranged in this order from the objective lens 21 on an optical axis of the objective lens 21.

A BS (beam splitter) 47 is arranged on the line that passes through the PBS 24 and perpendicularly intersects the optical axis of the objective lens 21. A ray of light split by the PBS 24 and going into the BS 47 is split into two rays, of which one travels straight forward through the BS 47 and the other one is reflected by the BS 47. In one direction in which the split ray of light travels straight forward through the BS 47, a condensing lens 45, a cylindrical lens 44 and a focusing beam receiving element 55 are arranged in this order. In the other direction in which the split ray of light reflected by the BS 47 travels, a condensing lens 46, a pinhole plate 43, and a readout beam receiving element 56 are arranged in this order. Further, a beam expander 48, a modulator 42, a collimating lens 41, and a recording laser 52 are arranged in this order on the line that passes through the DBS 25 and perpendicularly intersects the optical axis of the objective lens 21.

The objective lens 21 converges the recording beam and the reading beam on one of the plurality of recording layers 14. The objective lens 21 is moved in the optical axis direction by a focus actuator 21a which is driven under control of a controller 60, so as to bring the beam into focus on a desired recording layer 14.

The beam expander 22 is an optical element controlled by the controller 60 and causes light incident on the objective lens 21 to converge or diverge to correct spherical aberration generated in accordance with a change in the depth of the target recording layer 14 for recording and reading information from the surface of the optical information recording medium 10.

The quarter-wave plate 23 is an optical element for converting linearly-polarized light into circularly-polarized light and circularly-polarized light into linearly-polarized light in accordance with the rotational direction thereof. Upon reading out the information, the quarter-wave plate 23 makes the direction of the linearly-polarized light of the reading beam and the direction of the linearly-polarized light of the readout beam different by 90 degrees.

The PBS 24 is an optical element for reflecting and separating particular polarized light. The PBS 24 allows the recording beam emitted from the recording laser 52 and the reading beam emitted from the reading laser 51 to pass therethrough toward the optical information recording medium 10 and reflects the readout beam returned from the optical information recording medium 10 toward the BS 47.

The BS 47 is an optical element for splitting light with a predetermined splitting ratio irrespective of the polarization state of the light. The readout beam directed from the PBS 24 is split at the BS 47 and distributed to the focusing beam receiving element 55 and the is readout beam receiving element 56.

The DBS 25 is an optical element for reflecting light in a particular wavelength band while transmitting light in the other wavelength band. The DBS 25 is used to reflect the recording beam and to transmit the reading beam. In this embodiment, the DBS 25 is arranged such that the recording beam incident on the DBS 25 from side is directed toward the optical information recording medium 10.

The reading laser 51 is a 405 nm-CW (Continuous Wave) laser. In order to preferably narrow a beam to have a diameter equal to or smaller than the recoding spot, it is preferable that the reading laser 51 is used which emits a laser beam having a wavelength equal to or shorter than that of the laser beam emitted from the recording laser 52. The output of the reading laser 51 is controlled by the controller 60.

It is to be noted that the modulation of the signal using the recording and reading method according to this embodiment does not utilize interference effect of reflected lights reflected at upper and lower interfaces of the recording layer 14, so that even if a laser with a short coherence length (coherence length shows a tendency to indicate how easily interference of light occurs) is used as a light source of the reading beam, a high degree of modulation is obtained. If the coherence length is sufficiently short, it is possible to suppress undesirable decrease in the signal-to-noise ratio due to interference of multiple-reflection beams which would occur at the interfaces of each of the layers in the multi-layered optical information recording medium. As a result, excellent signal regeneration and servo characteristics are obtained. In general, it is known that the coherence length correlates with the full width at half maximum $\Delta\lambda$ of the spectrum of the light emitted from the light source, and this relation is represented by $\lambda^2/\Delta\lambda$, where $\lambda$ is the center wavelength of the light. To obtain sufficiently high resolution, the wavelength of the reading beam is preferably around 400 nm. In this instance, if the light with $\Delta\lambda$ of 8 nm or more is used, the coherence length is 20 μm or less, so that the interference of multiple-reflection lights from the interfaces of respective recording layers 14 is sufficiently decreased.

The recording laser 52 is a 522 nm-pulsed laser. To efficiently cause a multi-photon absorption reaction in the recording layer 14, it is preferable that the recording laser 52 is a pulsed laser with the peak power greater than that of the CW laser. The output of the recording laser 52 is controlled by the controller 60.

The modulator 42 removes part of the pulsed laser beam emitted from the recording laser 52 to temporally modulate the pulsed laser beam and encode the information. As an example of the modulator 42, Acousto-Optic Modulator (AOM), Mach-Zehnder (MZ) optical modulator, and other Electro-optic modulators (EOMs) may be used. When Acousto-Optic Modulator or Electro-optic modulator is used as the modulator 42, the laser beam can be turned on and off at extremely higher speeds as compared to a configuration with a mechanical shutter. Operation of the modulator 42 is controlled by the controller outputting to the modulator 42a signal encoded in accordance with the information to be recorded.

The focusing beam receiving element 55 utilizes a quadrant photodetector and is configured to obtain a focus controlling signal by making use of an astigmatic method or the like. To be more specific, focusing is performed by the controller 60 controlling a focus actuator 21a to minimize astigmatism generated after passing through the condensing lens 45 and the cylindrical lens 44.

The readout beam receiving element 56 receives the readout beam including the regenerated information. The signal detected by the readout beam receiving element 56 is output to the controller 60, and then the controller 60 demodulates the signal into the information. Since the light received by the focusing beam receiving element 55 has passed through the cylindrical lens 44, inputting the distribution of light intensity to the controller 60 enables the controller 60 to obtain the controlled variable used for the focusing servo for the is recording beam and the readout beam by means of the astigmatic method.

The pinhole plate 43 is arranged in the proximity of the focal point of the light condensed by the condensing lens 46. The pinhole plate 43 constitutes a confocal optical system, whereby the reflected light from a predetermined depth position of the optical information recording medium 10 is allowed to pass through the pinhole plate 43 while the other unnecessary light is cut.

Figure 4:
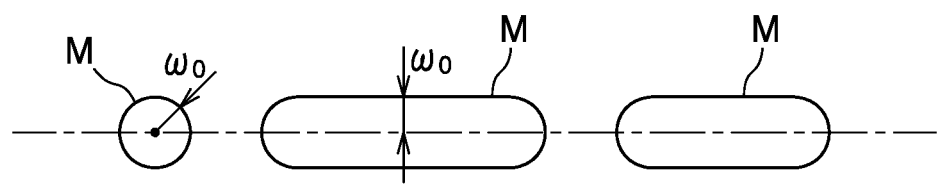
FIG. 4 is a top view of recording spots.

To irradiate a predetermined recording layer 14 of the optical information recording medium 10 with the recording beam, the controller 60 performs focusing with a focal position shifted by an offset amount d, which satisfies $\omega_0 < d < 3\omega_0$, from the interface 18 between the recording layer 14 and the intermediate layer 13 toward the incident side of the recording beam. To change the offset amount d, for example, the controller 60 controls the beam expander 48 arranged on the path of the recording beam to adjust converging or diverging of the recording beam. Herein, $\omega_0$ is the radius of the recording spots M shown in FIG. 4. As with the recording spot M shown in the left side of FIG. 4, the radius $\omega_0$ indicates the radius of a circular spot formed when the recording beam and the optical information recording medium are not moved relatively to each other. If an elongated recording spot is obtained as a result of a relative movement between the recording beam and the optical information recording medium 10 as with the two recording spots M shown in the middle and the right side of FIG. 4, the radius $\omega_0$ is determined as a half of the width of the recording spot M.

Figure 5:
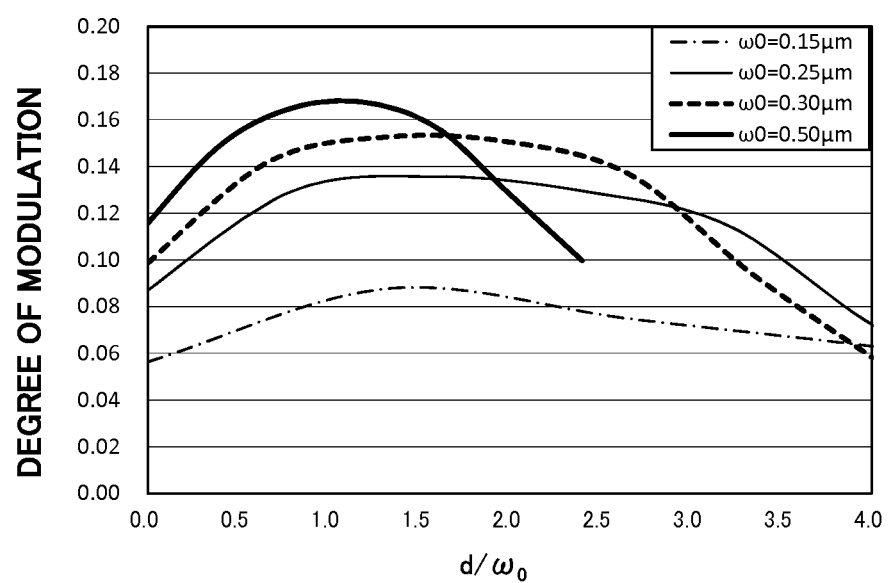
FIG. 5 is a graph showing the relationship between $d/\omega_0$ and degree of modulation.

Description will be given of the range of the offset amount d. First, the radius $\omega_0$ of a fine spot which can be formed by the laser beam is considered to be in the range of 0.1-0.3 µm. The radius $\omega_0$ of the spot to be recorded is determined from the diffraction limit which is determined by the wavelength of the recording beam used and the numerical aperture NA of the objective lens 21. It is preferable that the radius $\omega_0$ is approximately in the range of 0.1-0.3 µm taking into consideration the surface recording density per one recording layer 14 is and the wavelength of the recording laser used. Calculating the relationship between the ratio $d/\omega_0$ of the offset amount d to the radius $\omega_0$ and the degree of modulation as shown in FIG. 5 reveals that better degree of modulation can be obtained if $\omega_0$=0.15-0.3 µm and the value of $d/\omega_0$ is in the range of 1-3. Therefore, it is said that better offset amount d is in the range of $\omega_0 \langle d \langle 3\omega_0$. In this calculation, the thickness of the recording layer 14 is 1 µm.

Further, to irradiate a predetermined recording layer 14 of the optical information recording medium 10 with the reading beam, the controller 60 performs focusing with the interface 18 between the recording layer 14 and the intermediate layer 13 set as a target.

Other than the constructions described above, the recording and reading apparatus 1 has a construction similar to that of the conventional optical recording and reading apparatus. For example, in order to record a large number of recording spots M in a plane of a recording layer 14 of the optical information recording medium 10, the recording and reading apparatus 1 includes an actuator for moving the recording beam and the reading beam relative to the optical information recording medium 10 in a planar direction of the recording layer 14.

Description will be given of a recording and reading method using the recording and reading apparatus 1 as described above.

For recording information, the recording and reading apparatus 1 causes the recording laser 52 to emit a pulsed laser beam, which is then partly removed by the modulator 42 to encode the information. To obtain a predetermined offset amount d, the beam expander 48 adjusts converging or diverging of the information-encoded beam, and thereafter the beam is reflected by the DBS 25 and passes through the PBS 24, the quarter-wave plate 23, and the beam expander 22 in this order, after which the beam is converged by the objective lens 21. The reading laser 51 emits a CW laser beam concurrently with the emission of the pulsed laser beam; the CW laser beam passes through the DBS 25 and the PBS 24 and is is converged by the objective lens 21. The CW laser beam returned from the optical information recording medium 10 passes through the objective lens 21, the beam expander 22, and the quarter-wave plate 23 in this order, and is then reflected by the PBS 24 and the BS 47. Thereafter, the reflected CW laser beam passes through the condensing lens 46 and the pinhole plate 43 and enters the readout beam receiving element 56.

Figure 6:
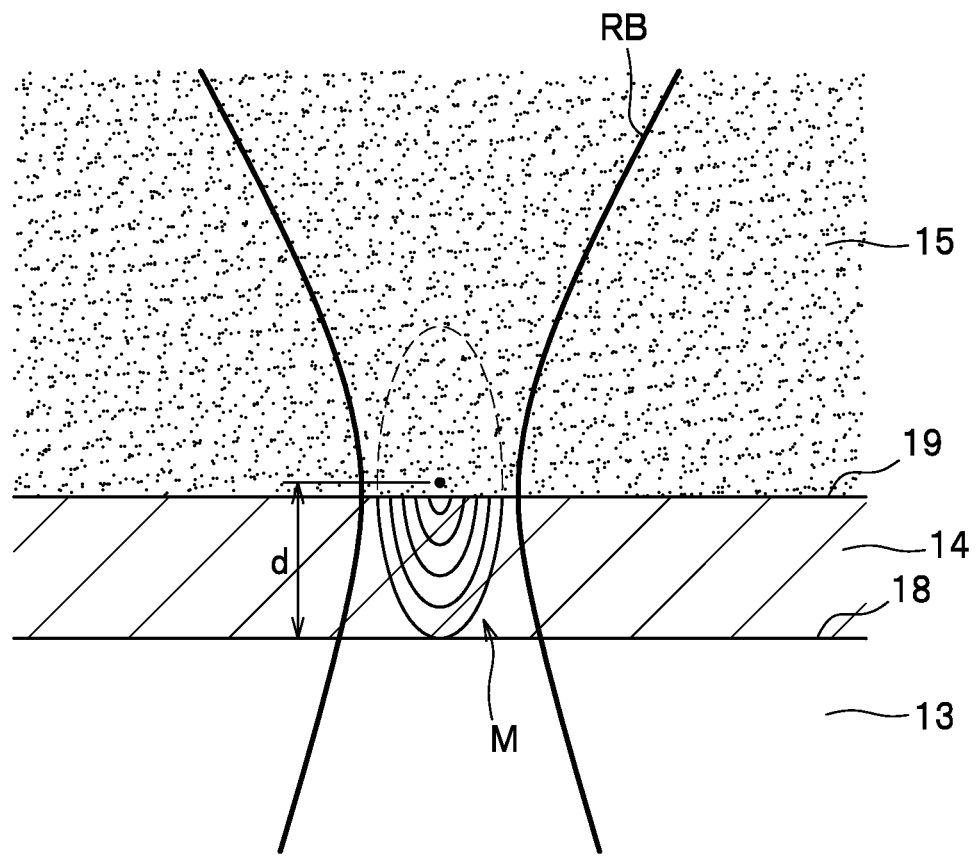
FIG. 6 is an explanatory view showing a focal position at the time of recording information and formation of a recording spot.

The controller 60 calculates focal positions of the recording beam and the CW laser beam based on the signal from the focus beam receiving element 55 and drives the focus actuator 21a and the beam expanders 22, 48, so as to adjust the focal position of the recording beam RB to a position shifted by the offset amount d from the interface 18 between the intermediate layer 13 and the recording layer 14 toward the incident side (see FIG. 6).

As schematically illustrated in FIG. 6, depending on the intensity of light, a light absorption reaction is induced more in the proximity of the focal point where the intensity of the light is strong (light is absorbed proportionally to the square of the intensity of the light in the case of the two-photon absorption reaction), at which position the refractive index is small in proportion to this reaction. For this reason, the distribution of the refractive index is formed in the recording layer 14 of 1 µm thick. The recording spot M with this distribution of the refractive index acts as a lens.

For reading the information, the recording and reading apparatus 1 stops the recording laser 52 and causes the reading laser 51 to drive to irradiate the optical information recording medium 10 with the CW laser beam. As with the recording of information, the CW laser beam (readout beam) returned from the optical information recording medium 10 is reflected by the PBS 24 and enters the readout beam receiving element 56 and the focus beam receiving element 55.

Figure 7:
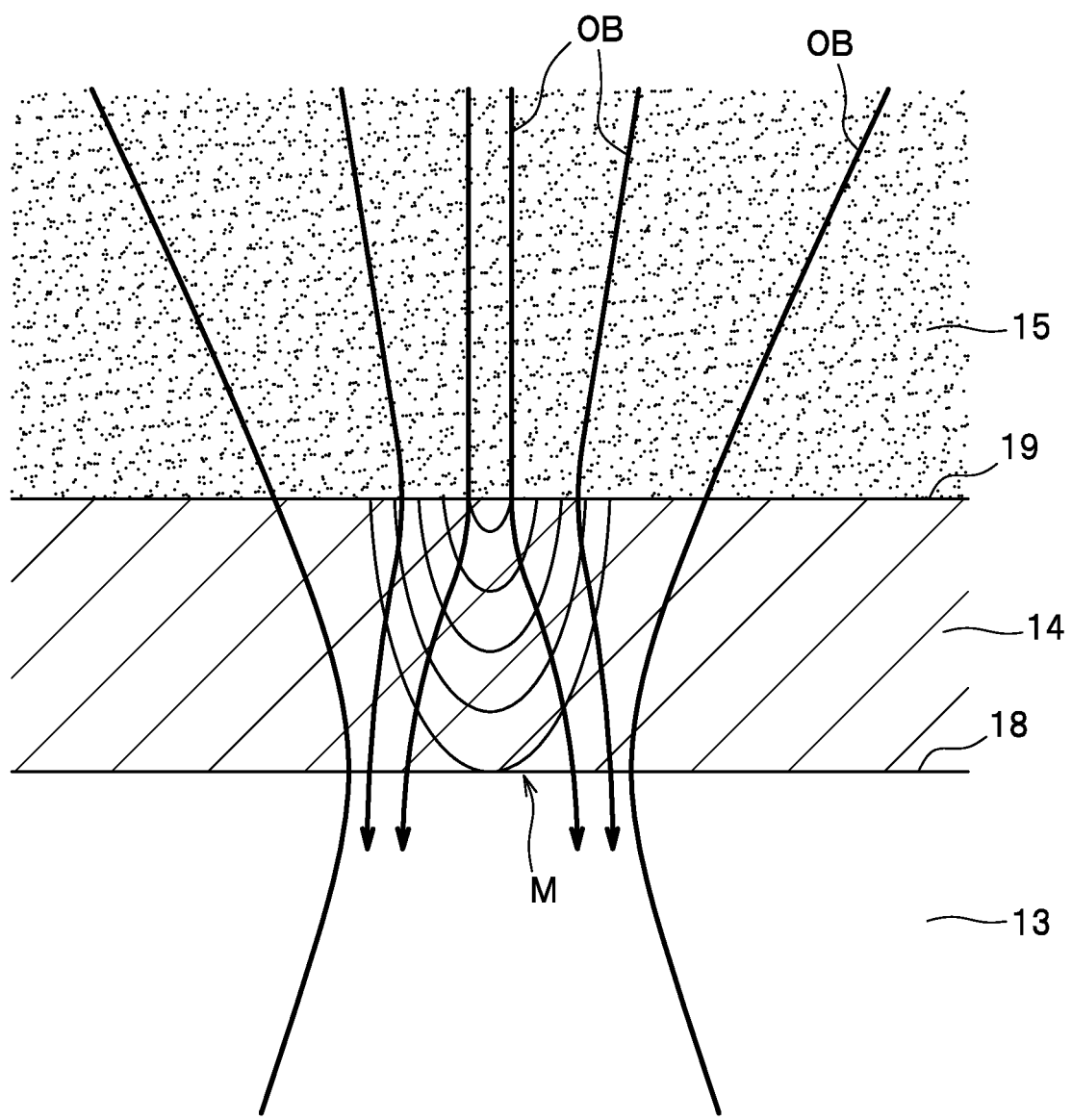
FIG. 7 is an explanatory view showing a focal position at the time of reading out the information and the lens effect at the recording spot.
Figure 8:
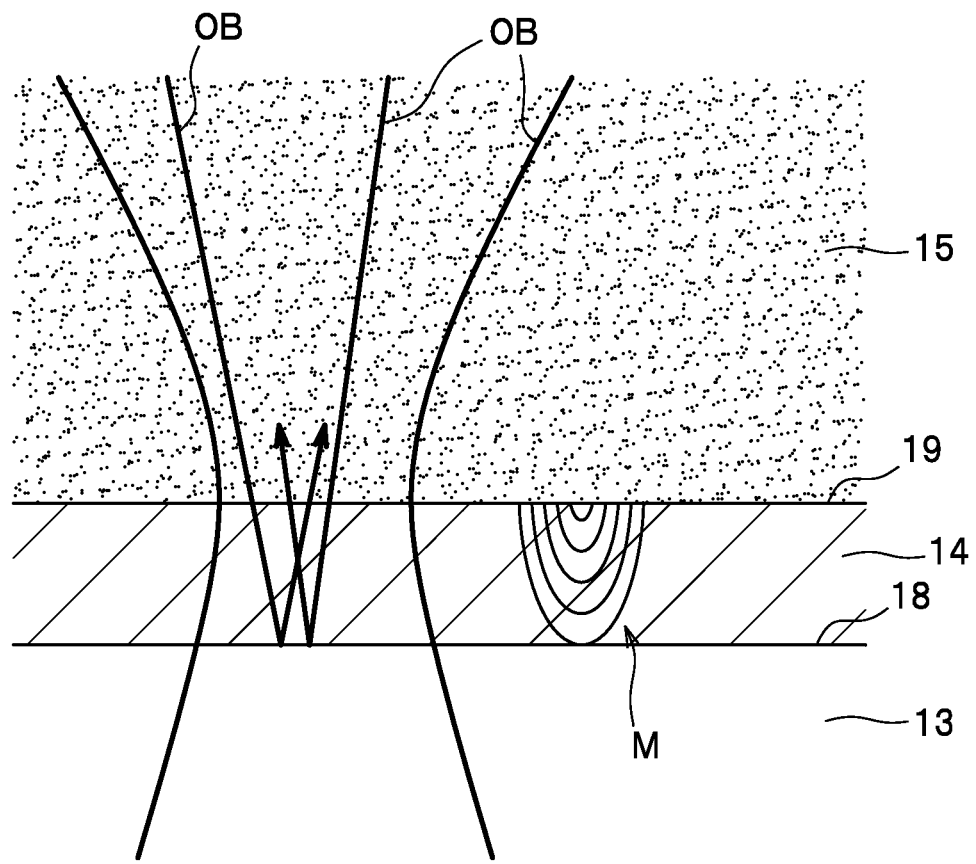
FIG. 8 is an explanatory view showing a focal position at the time of reading out the information and the reflection of the reading beam at a non-recorded position.

The controller 60 controls the focus actuator 21a and the beam expander 22 based on the signal output from the focus beam receiving element 55, and adjusts the focal position, as seen in FIG. 7, with the interface 18 between the intermediate layer 13 and the recording layer 14 set as a target. The reading beam OB then enters the recording spot M, and due to the lens effect of the recording spot M, it advances along a path diverging from the recording spot M. For this reason, almost no light is reflected at the interface 18 of the recording spot M, which results in decreased intensity of light detected by the readout beam receiving element 56. Meanwhile, as seen in FIG. 8, at a non-recorded portion of the recording layer 14, which is a portion other than recording spots M, the reading beam OB is reflected by the interface 18 and therefore the intensity of light detected by the readout beam receiving element 56 is increased.

Accordingly, the controller 60 demodulates the information from the modulation obtained from the difference between the intensity of the reflected light at the interface 18 of the recorded portion and the intensity of the reflected light at the interface 18 of the non-recorded portion. Namely, the information is regenerated.

According to the recording and reading method as described above in this embodiment, since the modulation for the reproduction output is obtained between the recorded portion and the non-recorded portion without using interference effect and by making use of the lens effect of the recording spot M formed in the recording layer 14, the optical information recording medium 10 can be manufactured without requiring highly-accurate film thickness of the recording layer 14 and thus with reduced manufacturing cost. Further, since the reflection of the reading beam at the interface 18 is used upon reading out the information, a higher reproduction output is obtained as compared with a method utilizing fluorescence.

Although one exemplary embodiment of the present invention has been described above, the present invention is not limited to the above-described embodiment and various changes and modifications may be made where necessary.

Figure 9:
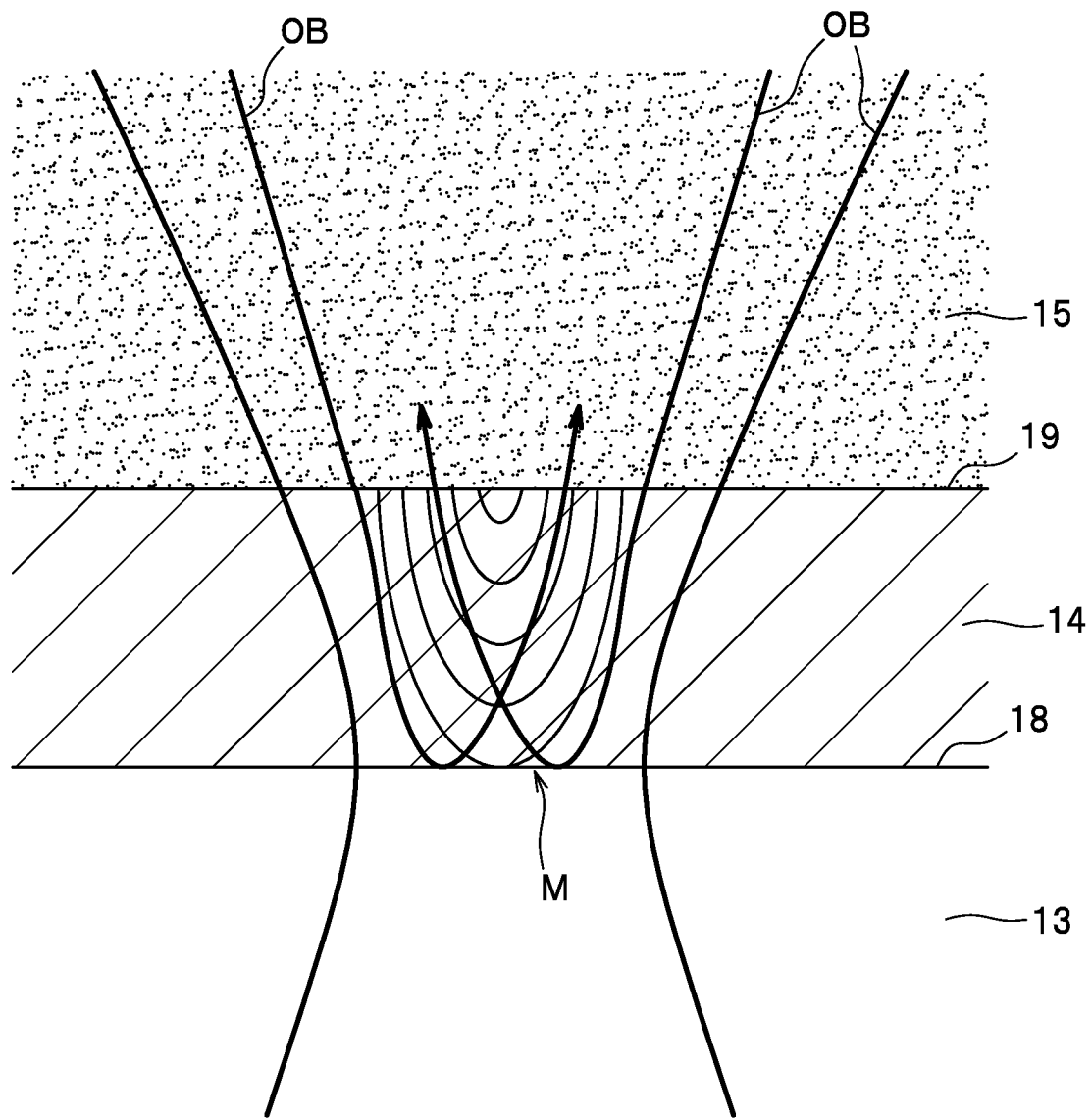
FIG. 9 is an explanatory view of a modified embodiment and showing the lens effect at the time of reading out information.

For example, in the above embodiment, the refractive index of the recording layer 14 decreases by irradiation with the recording beam. However, a recording material which increases the refractive index by irradiation with the recording beam may be used instead. In this instance, as seen in FIG. 9, since the recording spot M acts to collect the reading beam OB, the recorded portion reflects the reading beam OB with a reflectivity higher than that of the non-recorded portion, so that the modulation is generated by the difference in the intensity of the reflected light between the recorded portion and the non-recorded portion. Of course, to increase the degree of modulation to obtain a higher signal-to-noise ratio in the reproduction output, as with the above embodiment, it is preferable that the recording layer 14 contains a recording material which decreases the refractive index by irradiation with the recording beam.

Figure 10:
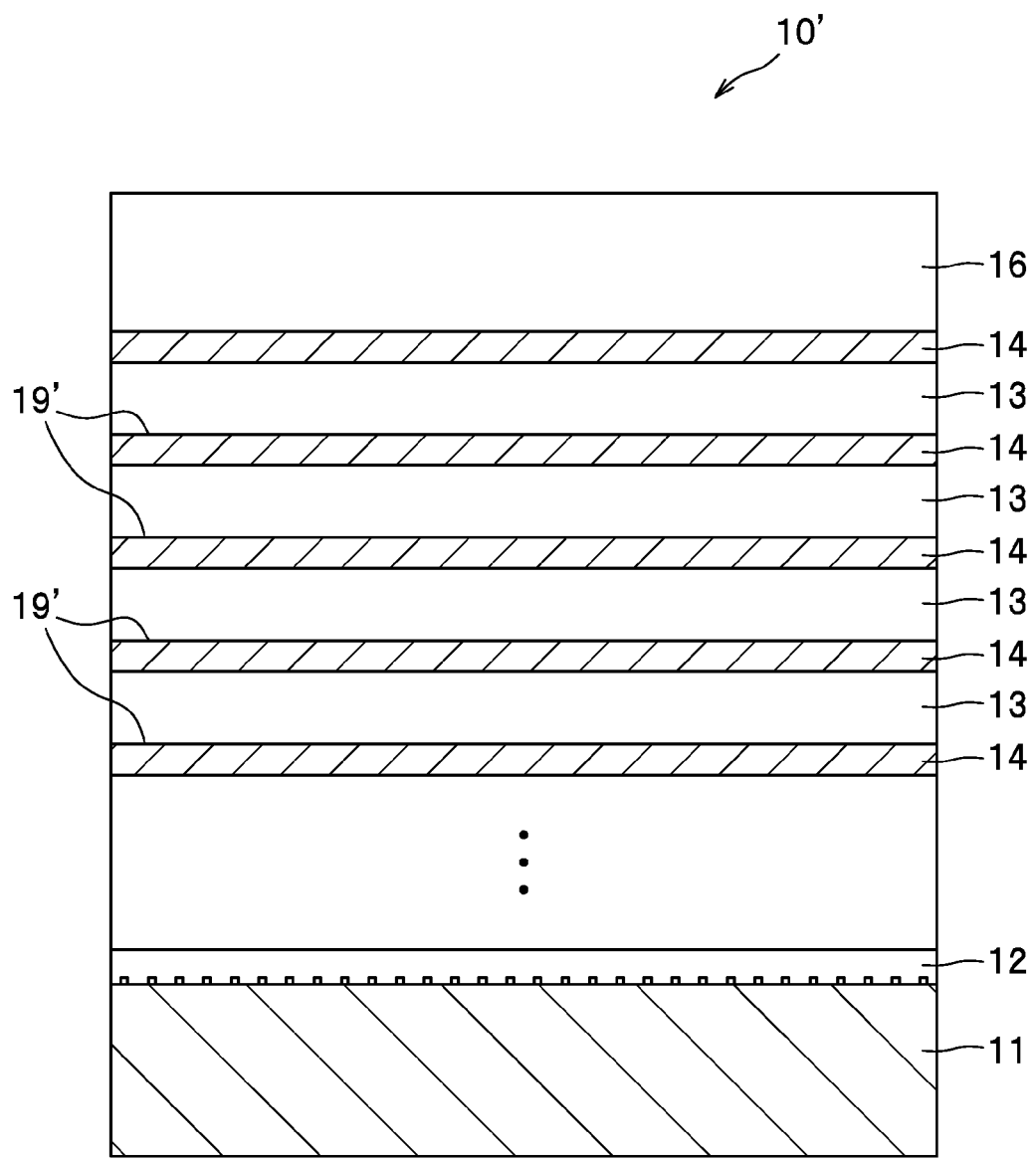
FIG. 10 is a sectional view showing another example of the optical information recording medium.

In the above embodiment, the optical information recording medium 10 employs the adhesive layers 15 which are substantially the same in refractive index as the recording layers 14. However, if each of the recording layers 14 has tackiness, for example, the intermediate layer 13 of 7 μm thick and the recording layer 14 of 3 μm thick may be alternately arranged as shown in FIG. 10. Further, in this modified embodiment, in order to make the interface 19' between the intermediate layer 13 and the recording layer 14 that is adjacent to the lower side (closer the substrate 11) of the intermediate layer 13 less reflective, it is preferable that the intermediate layer 13 has a distribution of refractive index in the thickness direction such that the reflective index of the intermediate layer 13 is closer to that of the recording layer 14 at a lower surface of the intermediate layer 13 whereas the reflective index of the intermediate layer 13 is different from that of the recording layer 14 at an upper surface of the intermediate layer 13.

Figure 11:
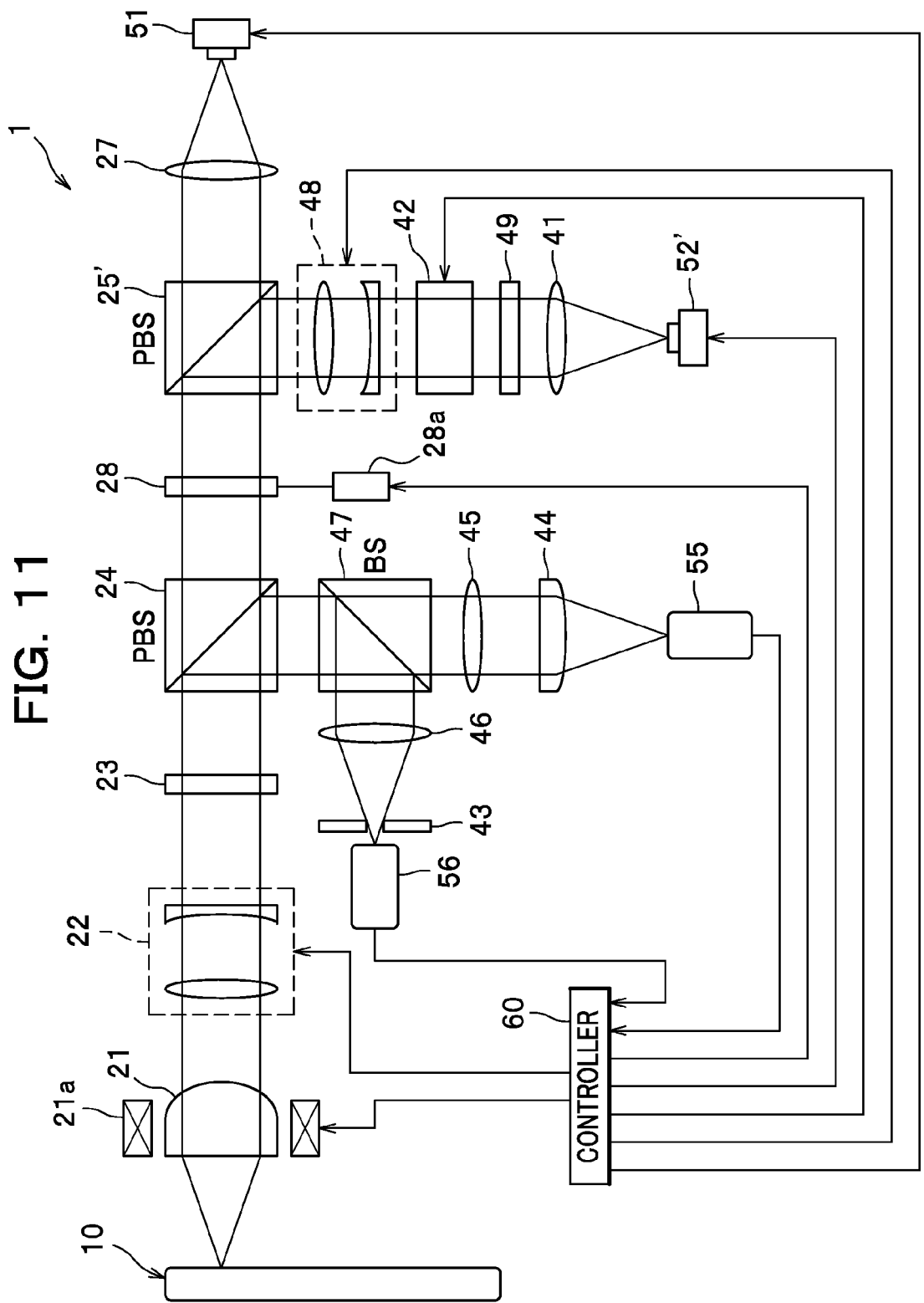
FIG. 11 is a diagram showing another example of the recording and reading apparatus.

Further, in the above embodiment, although the wavelength of the CW laser beam emitted from the reading laser 51 is different from the wavelength of the pulsed laser beam is emitted from the recording laser 52, the CW laser beam and the pulsed laser beam have the same wavelength. For example, if a recording laser 52' configured to emit a pulsed laser beam of 405 nm is used as the recording laser 52, as seen in FIG. 11, the DBS 25 is replaced with a PBS 25' and a half-wave plate 49 is arranged between the collimating lens 41 and the modulator 42, so that the readout beam derived from the reading laser 51 and the recording beam from the recording laser 52' are guided along the optical path on the optical axis of the objective lens 21 using the PBS 25'. Further, a half-wave plate 28 is arranged between the PBS 24 and the PBS 25', and an actuator 28a for rotating the half-wave plate 28 by 90 degrees is provided. With this configuration, the controller 60 causes the actuator 28a to drive to turn the half-wave plate 28 such that the half-wave plate 28 is oriented in different directions by 90 degrees at the time of recording and at the time of reading the information, whereby one of the recording beam and the reading beam is allowed to pass through the half-wave plate 28 as necessary light. This makes it possible to irradiate the optical information recording medium 10 with the recording beam at the time of recording and to irradiate the optical information recording medium 10 with the reading beam at the time of reading out the information.

What is claimed is:

1. A method for recording information in an optical information recording medium and thereafter reading out the information from the optical information recording medium, which medium comprises: a recording layer having a thickness equal to or greater than $2\lambda/n$, where $\lambda$ is a wavelength of a recording beam and n is a refractive index of the recording layer, and configured to undergo a change in the refractive index by irradiation with the recording beam; and an adjacent layer disposed adjacent to the recording layer at a side opposite to an incident side from which the recording beam enters the recording layer, the method comprising the steps of:

recording a recording spot by irradiating the optical information recording medium with the recording beam, while shifting a focal position by an offset amount d, which satisfies $\omega_0 < d < 3\omega_0$, where $\omega_0$ is a radius of the recording spot to be recorded in the recording layer, from an interface between the recording layer and the adjacent layer toward the incident side at a time of recording the information, whereby the refractive index of the recording layer changes at a recording position to record the recording spot; and reading out the information by irradiating the optical information recording medium with a reading beam, while bringing the reading beam into focus on the interface.

2. The method according to claim 1, wherein a recording material contained in the recording layer is a multi-photon absorption compound.

3. The method according to claim 1, wherein the full width at half maximum of spectrum of the reading beam is equal to or greater than 8 nm.

4. The method according to claim 1, wherein a confocal optical system is used for reading out the information.

* * * * *